United States Patent
Geiger et al.

(10) Patent No.: US 12,359,720 B2
(45) Date of Patent: Jul. 15, 2025

(54) ACCELERATION WITH VIRTUAL GEAR RATIOS FROM LOW SPEEDS

(71) Applicant: ZF Friedrichshafen AG, Friedrichshafen (DE)

(72) Inventors: Simon Geiger, Oberteuringen (DE); Matthias Duller, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/672,615

(22) Filed: May 23, 2024

(65) Prior Publication Data

US 2024/0392875 A1    Nov. 28, 2024

(30) Foreign Application Priority Data

May 26, 2023  (DE) .................. 10 2023 204 945.7

(51) Int. Cl.
  *F16H 61/662*   (2006.01)
  *F16H 61/66*    (2006.01)

(52) U.S. Cl.
  CPC .................. *F16H 61/66259* (2013.01); *F16H 2061/6615* (2013.01)

(58) Field of Classification Search
  CPC ...... F16H 61/66259; F16H 2061/6615; B60W 10/06; B60W 10/101; B60W 10/103; B60W 10/105; B60W 10/107; B60W 2540/10; B60W 2510/0638; B60W 2520/10
  See application file for complete search history.

(56) References Cited

U.S. PATENT DOCUMENTS

| | | | |
|---|---|---|---|
| 7,641,586 B2 | 1/2010 | Wild et al. | |
| 8,585,543 B1 * | 11/2013 | Davis | B60K 31/00 477/43 |
| 2014/0121911 A1 * | 5/2014 | Davis | B60W 10/103 701/51 |
| 2016/0001769 A1 * | 1/2016 | Kamioka | B60W 10/08 180/65.265 |
| 2022/0356947 A1 * | 11/2022 | Kishi | F16H 59/36 |

FOREIGN PATENT DOCUMENTS

| | | |
|---|---|---|
| DE | 100 56 530 A1 | 5/2002 |
| DE | 10 2009 035 780 A1 | 2/2011 |
| DE | 10 2020 213 937 A1 | 5/2022 |
| DE | 10 2020 213 939 A1 | 5/2022 |

OTHER PUBLICATIONS

German Office Action, Office Action issued in German patent application No. 10 2023 204 945.7 (Jan. 18, 2024).

* cited by examiner

*Primary Examiner* — Timothy Hannon
(74) *Attorney, Agent, or Firm* — Finch & Maloney PLLC

(57) ABSTRACT

The invention relates to a method for accelerating a vehicle with a continuously variable transmission (1050) where a gear ratio of the transmission is at first larger than a gear ratio of a virtual fixed gear. While the vehicle is accelerating, the gear ratio of the transmission is increased to the gear ratio of the virtual fixed gear. The transmission is then operated with the gear ratio of the virtual fixed gear.

6 Claims, 4 Drawing Sheets

ACCELERATION WITH VIRTUAL GEAR RATIOS FROM LOW SPEEDS

RELATED APPLICATIONS

This application claims the benefit of and right of priority under 35 U.S.C. § 119 to German Patent Application no. 10 2023 204 945.7, filed on 26 May 2023, the contents of which are incorporated herein by reference in its entirety.

FIELD OF THE DISCLOSURE

The invention relates to a method for accelerating a vehicle with a continuously variable transmission (CVT), and to a computer program product configured to perform the method.

BACKGROUND

DE 10 2020 213 937 A1 discloses the operation of a power-branched continuously variable transmission with virtual gears. By means of a virtual fixed gear a gear ratio of the transmission is specified.

From US 2014/0121911 A1 it is known to operate a CV T transmission with virtual fixed gears. In this case, a number of virtual gears are simulated in order to give the user the impression of a fixed-gear transmission. The CVT transmission is controlled with reference to a torque vs. rotation-speed characteristic curve that relates an output torque and an output rotation speed to one another.

SUMMARY

With decreasing rotation speed of a drive input torque, in a virtual fixed gear the driving speed decreases proportionally. The rotation speed of an internal combustion engine, however, cannot be reduced arbitrarily. To prevent the motor from no longer turning or from stalling, a minimum rotation speed is needed. Accordingly, it makes sense to deviate from the virtual fixed gear ratio and increase the gear ratio of the transmission if the travel speed of the vehicle decreases to the point where there is a risk that a rotation speed of the motor might fall below the minimum rotation speed.

When the transmission gear ratio deviates from the virtual fixed gear ratio, the objective is to revert back to the virtual fixed gear ratio. In this, disturbances or irritations of the driver due to undesired or unexpected behavior of the drivetrain should be avoided. That objective is achieved by a method for accelerating a vehicle with a continuously variable transmission, and a computer program configured to perform the method. Preferred further developments will be apparent in light of the present disclosure.

The method according to the invention serves to accelerate a vehicle, for example a building machine or an agricultural machine, whose drivetrain comprises a continuously variable transmission. Beside the transmission, the drivetrain comprises a motor whose drive torque is transmitted by the transmission to the driven wheels of one or more axles of the vehicle.

A continuously variable transmission describes a transmission whose gear ratio can be varied continuously. The quantity of possible gear ratios of the transmission thus forms a full interval of real numbers. In particular, the transmission concerned can be a power-branched continuously variable transmission.

A continuously variable transmission can be operated with one or more fixed gears. A virtual fixed gear is defined as a gear ratio which is constant at least during a time interval and to that extent corresponds to a gear ratio of a gear of a fixed-gear transmission. To operate the transmission with the virtual fixed gear, the gear ratio of the transmission is controlled or regulated in such manner that a gear ratio of the transmission corresponds to the gear ratio of the virtual fixed gear. The virtual fixed gear can be selected manually, for example by means of a gear selector lever, or it can be specified by a control unit such as a transmission control unit.

As already explained above, depending on the driving situation, it can be necessary for the gear ratio of the transmission to deviate from the virtual fixed gear ratio. The method according to the invention starts from a gear ratio of the transmission to begin with, that is to say at the beginning of the method, that is larger than the gear ratio of the virtual fixed gear. An input rotation speed, that is to say a rotation speed of an input shaft of the transmission, is then higher than a rotation speed that would correspond to the virtual fixed gear.

Thereafter, to be able to operate the transmission with the virtual fixed gear, the discrepancy between the gear ratio of the transmission and the gear ratio of the virtual fixed gear must be eliminated. For that purpose, the invention provides that the gear ratio of the transmission is made equal to the gear ratio of the virtual fixed gear while the vehicle is accelerating.

In detail, the method according to the invention provides that the vehicle accelerates and during this the gear ratio of the transmission is increased to the gear ratio of the virtual fixed gear. Thus, according to the invention the gear ratio of the transmission is controlled or regulated in such manner that the gear ratio of the transmission increases until it matches the gear ratio of the virtual fixed gear.

Then, that is to say, as soon as equality is reached between the gear ratio of the transmission and the gear ratio of the virtual fixed gear, the transmission is operated with the gear ratio of the virtual fixed gear. While operating with the virtual fixed gear the vehicle can accelerate further, drive on at the same speed, or decelerate. During this the gear ratio of the transmission in each case matches the gear ratio of the virtual fixed gear. Thus, while accelerating, driving at the same speed, or decelerating, the transmission is controlled or regulated in such manner that its gear ratio matches the gear ratio of the virtual fixed gear.

As a result of the invention, a rotation speed of the motor increases with increasing speed even if the gear ratio of the transmission differs from the gear ratio of the virtual fixed gear. This gives the driver the familiar impression of an acceleration with a fixed gear ratio.

During an acceleration with a fixed gear ratio, the rotation speed of the motor increases as a function of a driving speed of the vehicle, in a strictly monotonic manner. In a preferred further development, this is reproduced by a gear ratio of the transmission which increases strictly monotonically as a function of the driving speed of the vehicle while it is accelerating.

In a preferred further development, the gear ratio of the transmission varies as a function of the driving speed at least partially in a linear manner. In particular, the gear ratio of the transmission can vary in a linear manner from the beginning, that is to say from the beginning of the increase according to the invention, until the end, that is to say until the gear ratio of the transmission matches the gear ratio of the virtual fixed gear. Owing to the linear course of the gear ratio of the transmission, the variation of the rotation speed of the motor is particularly harmonic.

Preferably, the method is developed further with a rotation speed management system for the control or regulation of the gear ratio of the transmission. This means that as a guide magnitude for controlling or regulating the transmission and its gear ratio, a—preferably variable—input rotation speed is specified. The input rotation speed is a rotation speed of the input shaft of the transmission. If there is a fixed coupling between the motor and the transmission, the input rotation speed is the same as a rotation speed of an output shaft of the motor.

The further development envisages a target speed. Since the vehicle is accelerating, it should reach the target speed. The input rotation speed is a function of the speed of the vehicle and the gear ratio of the transmission Thus, a particular target input rotation speed corresponds to the target speed and the gear ratio of the virtual fixed gear. This is determined, for example calculated, or taken from a stored data set.

The input shaft of the transmission rotates at the target input rotation speed when the vehicle is travelling at the target speed and the gear ratio of the transmission is the same as the gear ratio of the virtual fixed gear. According to this further development, the guide magnitude is therefore increased to the target input rotation speed while the vehicle is accelerating.

In an also preferred further development, an accelerator pedal or lever is used to determine the target speed. The target speed depends on a position of the accelerator pedal or lever. Correspondingly, the position of the accelerator pedal or lever is determined by measuring the position of the accelerator pedal or lever. Ultimately, the target speed is determined as a function of the previously measured position of the accelerator pedal or lever.

It is also possible to make the target speed dependent on the specification by a control unit. The control unit preferably specifies the target speed if the vehicle is operated with a tempomat.

A final speed that the vehicle is capable of reaching also depends on external factors which impede the propulsion of the vehicle. For example, under otherwise the same conditions the vehicle will reach a lower final speed while driving up an incline that it would on level ground. Loads that the vehicle is towing also reduce the final speed it can reach. The result can be that the final speed attainable is lower than the target speed. In that case the vehicle would only accelerate up to the final speed attainable. Until then the gear ratio of the transmission would also be raised However, since under the circumstances described the vehicle does not reach the target speed, the gear ratio of the transmission too does not reach the gear ratio of the virtual fixed gear. To correct this and to ensure that the gear ratio of the transmission matches the gear ratio of the virtual fixed gear, when the vehicle reaches the final speed, then in a preferred further development the guide magnitude is correspondingly scaled. For that, the final speed is first extrapolated. This preferably takes place having regard to external influencing factors such as a road inclination or a load being towed by the vehicle, which factors influence the final speed. It is advantageous to take into account the acceleration of the vehicle in the interpolation of the final speed, since the acceleration is subject to the sane factors that impede the propulsion of the vehicle as is the final speed attainable.

If it turns out that the final speed is lower than the target speed, then in accordance with the further development the guide magnitude is scaled in that while the vehicle is accelerating the guide magnitude is increased to an input rotation speed associated with the input rotation speed existing at the final speed and the gear ratio of the virtual fixed gear. A corresponding function, which describes the course of the guide magnitude as a function of the speed of the vehicle, is preferably flattened toward the final speed. This is equivalent to an under-proportional increase of the guide magnitude or a decreasing slope of the function.

The method according to the invention or one of the above-described further developments are preferably developed further as part of a method for accelerating the vehicle which contains a testing step. In the testing step, it is checked whether the gear ratio of the transmission corresponds to the gear ratio of the virtual fixed gear or matches it, or whether the gear ratio of the transmission is larger than the gear ratio of the virtual fixed gear.

If the test shows that the gear ratio of the transmission corresponds to the gear ratio of the virtual fixed gear, then during the acceleration of the vehicle the transmission is operated with the gear ratio of the virtual fixed gear. Thus, the transmission is controlled or regulated in such manner that its gear ratio remains constant and the gear ratio during this corresponds to the gear ratio of the virtual fixed gear.

On the other hand, if the test shows that the gear ratio of the transmission is larger than the gear ratio of the virtual fixed gear, then according to the invention or one of the above-described preferred further developments, the vehicle is accelerated.

The computer program according to the invention implements the method according to the invention or a preferred further development of the method. Thus, the computer program is designed to carry out the method according to the invention or one of its preferred further developments. This means that the computer program contains instructions for carrying out the method according to the invention or a preferred further development thereof. These instructions enable a computer, for example a vehicle control unit and preferably a transmission control unit, to carry out the method according to the invention or a preferred further development thereof when the computer program is run on the computer.

The computer program can be contained in a computer, stored in a storage medium or coded in one or more transmissible or transmitted signals. In particular the computer program can be in the form of a computer program product, i.e., a unit that can be traded or a unit that serves the purpose of transferring ownership of the computer program. The computer program can be in the form of software or designed as a circuit logic implemented in hardware.

BRIEF DESCRIPTION OF THE DRAWINGS

Preferred example embodiments of the invention are shown in the figures, in which the sane indexes denote the same or functionally equivalent features, and which show, in detail.

DETAILED DESCRIPTION

Figure 1:
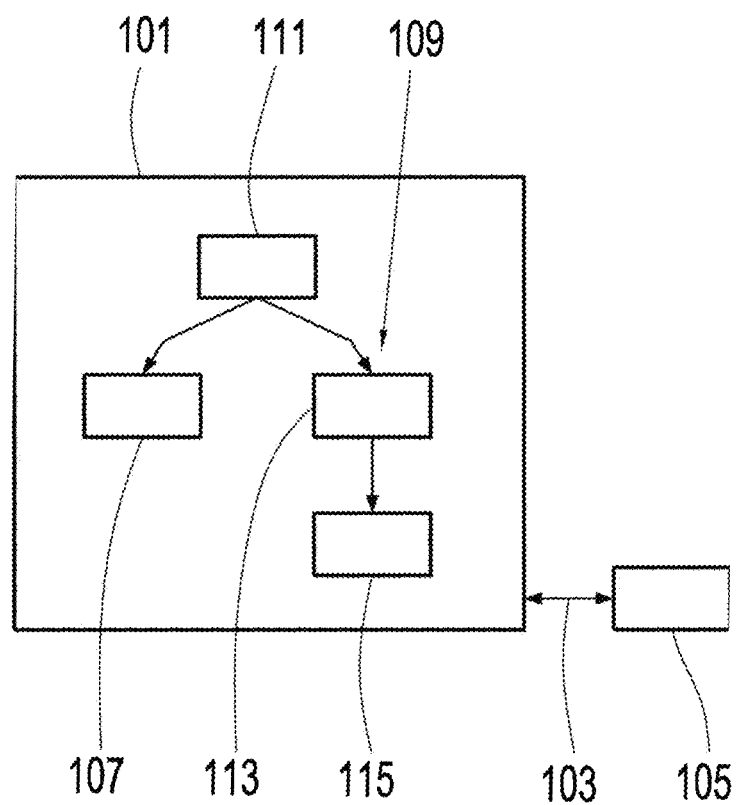
FIG. 1: A flow-chart.

In FIG. 1 the design of a computer program in a vehicle control unit 101, with instructions for accelerating a vehicle, is shown. The Vehicle control unit 101 is connected by way of signal leads 103 to a continuously variable transmission 105. As a function of the signals transmitted by the control unit 101 to corresponding actors of the transmission 105 via the signal leads 103, a gear ratio of the transmission 105 can be controlled or regulated.

The process is divided into a first branch 107 and a second branch 109. The first branch 107 and the second branch 109 are created as a function of a checking step 111.

In the testing step, it is checked whether the gear ratio of the transmission 105 corresponds to, or is larger than, a gear ratio of a virtual fixed gear. If the gear ratio of the transmission corresponds to the gear ratio of the virtual fixed gear, the first branch 107 is carried out.

When the first branch 107 is carried out, the control unit 101 is enabled to send signals to the transmission 105 via the signal leads 103, which signals control or regulate its gear ratio so that the vehicle accelerates with the gear ratio of the virtual fixed gear. In that case the gear ratio of the transmission corresponds to the gear ratio of the virtual fixed gear.

On the other hand, if the check 111 shows that the gear ratio of the transmission is larger than the gear ratio of the virtual fixed gear, then in a first process step 113 of the second branch 109 the gear ratio of the transmission is progressively increased to the gear ratio of the virtual fixed gear while the vehicle is accelerating.

In a subsequent, second process step 115 the transmission is then operated with the gear ratio of the virtual fixed gear.

Figure 2:
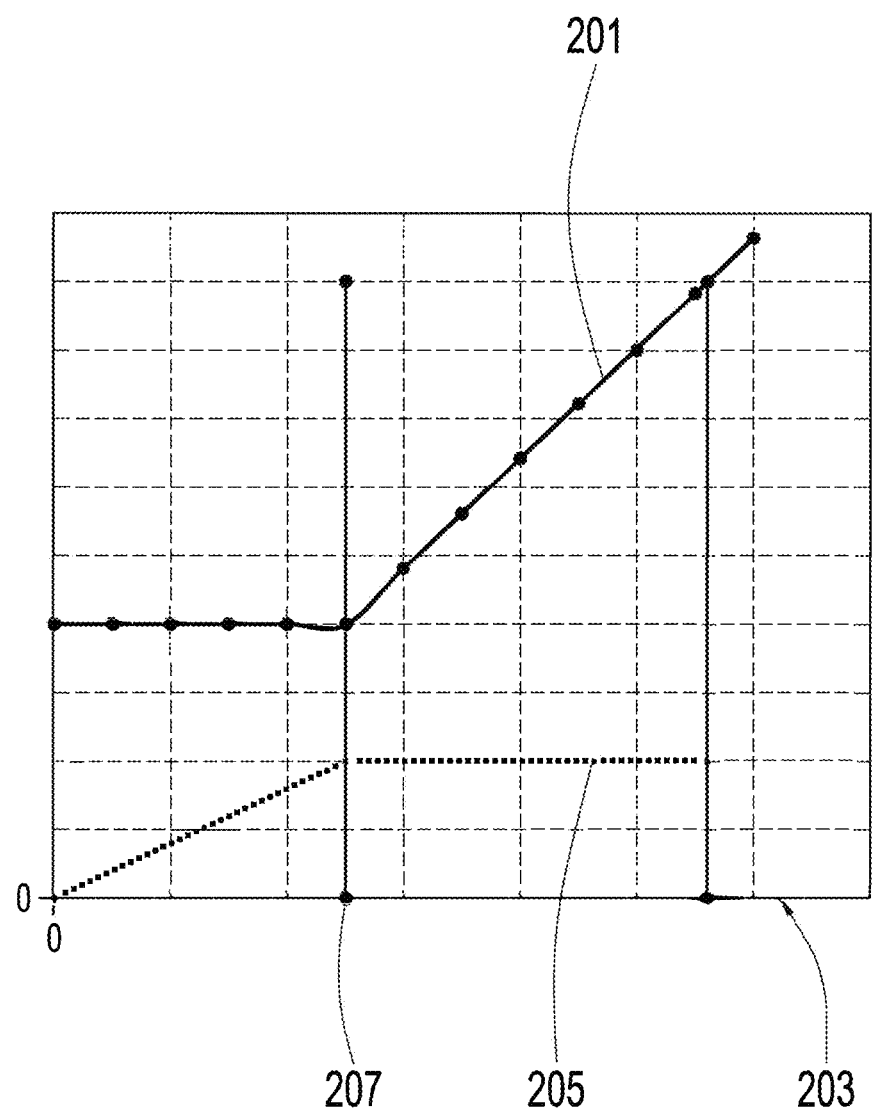
FIG. 2: A rotation speed and gear ratio variation.
Figure 3:
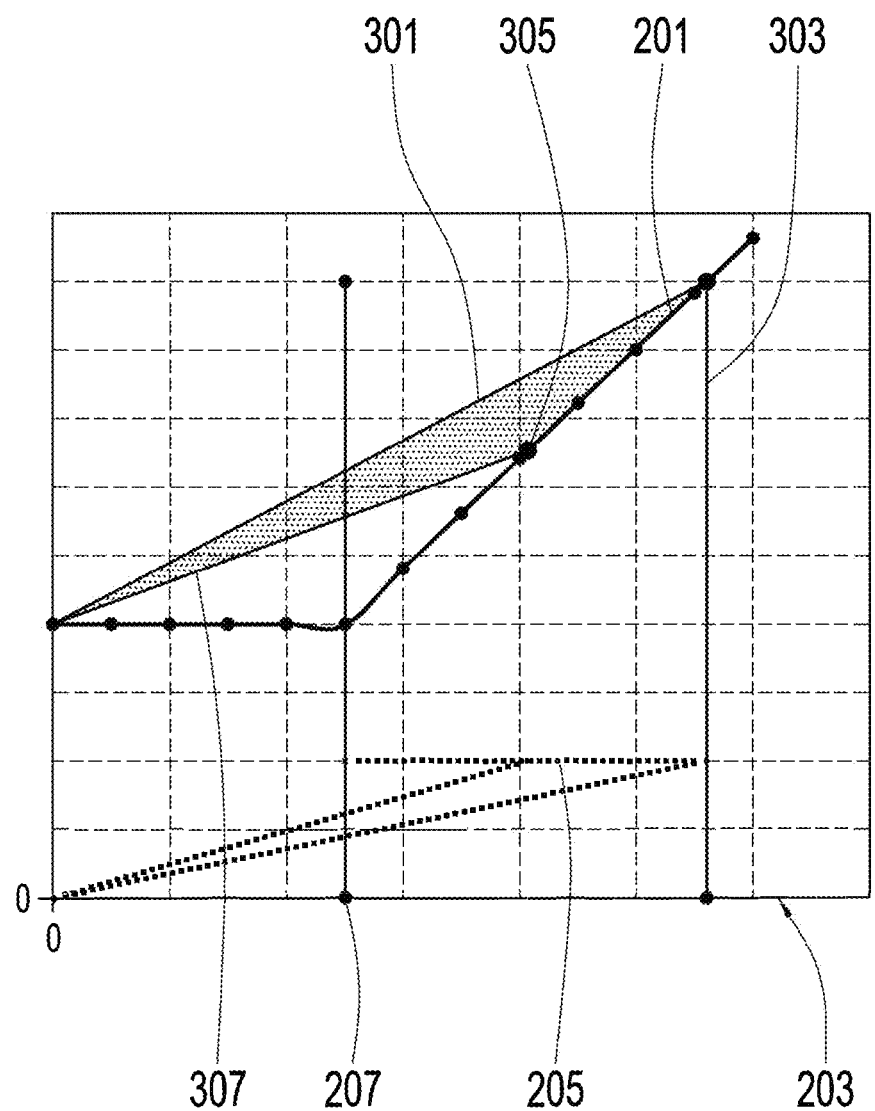
FIG. 3: A corrected rotation speed and gear ratio variation with acceleration from standstill.
Figure 4:
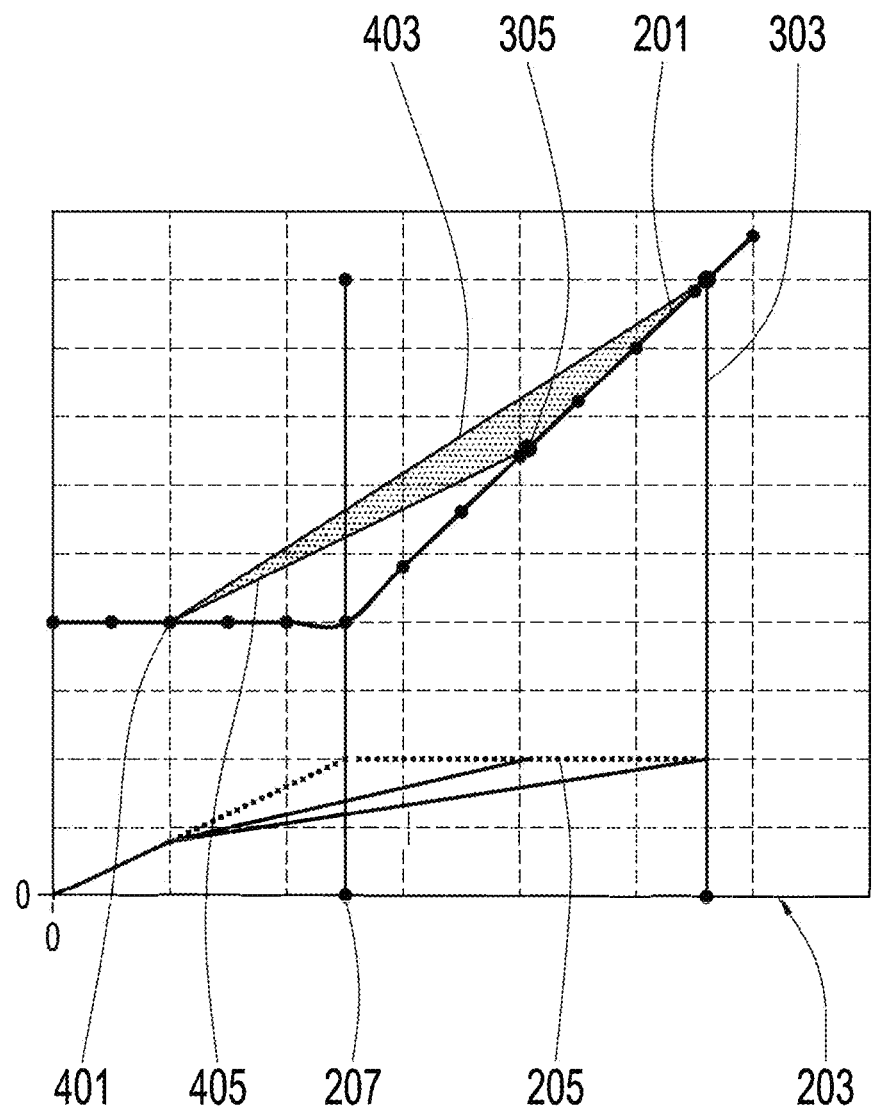
FIG. 4: A corrected rotation speed and gear ratio variation with acceleration while travelling.

In FIGS. 2 to 4 the variation of an input rotation speed 201 of the transmission 105 is plotted against a speed 203 at which the vehicle concerned is travelling. In addition, the variation of an associated reciprocal gear ratio 205, i.e., a quotient of the output rotation speed and the input rotation speed, is plotted against the speed 203.

If a fixed-gear ratio is simulated, then as shown in FIG. 2 the input rotation speed 201 is linear above a limit speed 207. The associated reciprocal gear ratio 205 is constant.

The limit speed 207 marks a minimum rotation speed of a motor of the vehicle. If the vehicle drives at the limit speed 207, the input rotation speed 201 corresponds to the minimum rotation speed. As the minimum rotation speed, for example the idling rotation speed of the motor or a rotation speed at which, if the rotation speed falls below it, the motor begins to run roughly can be considered.

If the linear course of the input rotation speed 201 were to be maintained during a deceleration of the vehicle as a result of which the rotation speed fell below the limit speed 207, the consequence would be that the rotation speed would fall below the minimum rotation speed. To avoid that, if the rotation speed falls below the limit speed 207 the reciprocal gear ratio 205 is reduced in such manner that the input rotation speed 201 remains constant.

If now, from a speed below the limit speed 207 the vehicle accelerates in accordance with the variation of the input rotation speed 201 shown in FIG. 2, then at first the input rotation speed 201 would remain constant until the limit speed 207 is reached. This, however, is undesirable since such a rotation speed variation does not correspond to the expectations of a driver who is used to the behavior of vehicles with a fixed-gear transmission.

It is characteristic of the rotation speed variation with a fixed-gear transmission that the input rotation speed 201 increases as the speed 203 increases. This can be modeled by a linear course of the input rotation speed 201 during an acceleration from a speed that is lower than the limit speed 207.

A first straight line 301 describes a variation of the input rotation speed 201 when the accelerator pedal is fully depressed, i.e., when the accelerator pedal is in its full-throttle position. An associated first target speed 303 corresponds to a final speed of the vehicle under full throttle.

According to FIG. 3 the vehicle is accelerated from rest, i.e., from zero speed, beginning with an initial input rotation speed 201 that corresponds to the minimum rotation speed.

When the first target speed 303 is reached, the input rotation speed 201 is determined by the first target speed and the gear ratio of the virtual fixed gear. Between these two rotation speeds the input rotation speed 201 is interpolated linearly. While the vehicle is accelerating to the first target speed 303, the gear ratio of the transmission 105 is regulated in such manner that the course of the input rotation speed 201 as a function of the speed 203 follows the first line 301.

At another accelerator pedal position less far depressed than at full throttle, there is a second target speed 305 which is lower than the first target speed 303. With the second target speed 305, as a function of the gear ratio of the virtual fixed gear there corresponds a correspondingly lower input rotation speed 201. By linear interpolation a course of the input rotation speed corresponding to a second line 307 is obtained.

The second line describes the variation of the input rotation speed 201 when accelerating from rest but with a less far depressed accelerator pedal position. The slope of the second line 307 is less steep than the slope of the first line 301.

In FIG. 4 corresponding variations of the input rotation speed 201 when accelerating from an initial speed 401 are shown, which is greater than zero and smaller than the limit speed 207. A third line 403 obtained by linear interpolation describes the variation of the input rotation speed rotation speed 201 when accelerating with the accelerator pedal at full throttle to the first target speed 303. At a reduced accelerator pedal setting an input rotation speed 201 according to a fourth line 405 is obtained, which interpolates a course of the input rotation speed 201 from the initial speed 401 to the second target speed 305.

The interpolation of the input rotation speed by means of lines can take place from any desired starting point. In particular, it is possible to adapt the interpolation if the accelerator pedal setting changes during the acceleration process.

INDEXES

101 Vehicle control unit
103 Signal lead
105 Transmission
107 First branch
109 Second branch
111 Checking step
113 First process step
115 Second process step
201 Input rotation speed
203 Speed
205 Reciprocal gear ratio
207 Limit speed
301 First line
303 First target speed
305 Second target speed
307 Second line
401 Initial speed
403 Third line
405 Fourth line

The invention claimed is:

1. A method for accelerating a vehicle with a continuously variable transmission, wherein a gear ratio of the transmission is at first different than a gear ratio of a virtual fixed gear, wherein the method comprises:
   specifying an input rotation speed as a guide magnitude for controlling the transmission;
   changing the gear ratio of the transmission, while the vehicle is accelerating, to the gear ratio of the virtual fixed gear, thereby increasing the input rotation speed of the transmission;
   increasing the guide magnitude, while the vehicle is accelerating, to an input rotation speed associated with a target speed and the gear ratio of the virtual fixed gear;
   determining a position of an accelerator pedal or lever by measurement;
   determining the target speed as a function of the position of the accelerator pedal or lever;
   extrapolating a final speed of the vehicle;
   determining, while the vehicle is accelerating, that the final speed is lower than the target speed;
   increasing the guide magnitude to an input rotation speed associated with the final speed and the gear ratio of the virtual fixed gear; and
   operating the transmission with the gear ratio of the virtual fixed gear.

2. The method according to claim 1, wherein increasing the gear ratio is performed strictly monotonically as a function of a driving speed of the vehicle.

3. The method according to claim 2, wherein the gear ratio of the transmission varies as a function of the driving speed at least partially in a linear manner.

4. A non-transitory computer-readable recording medium carrying a computer program that performs the method of claim 1.

5. A method for accelerating a vehicle with a continuously variable transmission, comprising:
   specifying an input rotation speed as a guide magnitude for controlling the transmission;
   checking whether a gear ratio of the transmission corresponds to a gear ratio of a virtual fixed gear or is larger than the gear ratio of the virtual fixed gear;
   determining that the gear ratio of the transmission is larger than the gear ratio of the virtual fixed gear;
   changing the gear ratio of the transmission, while the vehicle is accelerating, to the gear ratio of the virtual fixed gear;
   increasing the guide magnitude, while the vehicle is accelerating, to an input rotation speed associated with a target speed and the gear ratio of the virtual fixed gear;
   determining a target speed as a function of the position of the accelerator pedal or lever;
   extrapolating a final speed of the vehicle;
   determining, while the vehicle is accelerating, that the final speed is lower than the target speed;
   increasing the guide magnitude to an input rotation speed associated with the final speed and the gear ratio of the virtual fixed gear; and
   operating the transmission with the gear ratio of the virtual fixed gear.

6. A non-transitory computer-readable recording medium carrying a computer program that performs the method of claim 5.

* * * * *